US009142843B2

(12) United States Patent
Beylich et al.

(10) Patent No.: US 9,142,843 B2
(45) Date of Patent: Sep. 22, 2015

(54) COOLING DEVICE FOR A FUNCTIONAL SYSTEM

(75) Inventors: Markus Beylich, Ludwigsburg (DE); Michael Fasold, Auenwald (DE); Peter Teuschel, Woergl (AT); Wolfgang Schwienbacher, Dettingen (DE); Christoph Koch, Kirchheim (DE)

(73) Assignees: MANN+HUMMEL GMBH, Ludwigsburg (DE); DAIMLER AG, Stuttgart (DE)

( * ) Notice: Subject to any disclaimer, the term of this patent is extended or adjusted under 35 U.S.C. 154(b) by 238 days.

(21) Appl. No.: 13/371,674

(22) Filed: Feb. 13, 2012

(65) Prior Publication Data
US 2012/0148930 A1 Jun. 14, 2012

Related U.S. Application Data

(63) Continuation of application No. PCT/EP2010/061808, filed on Aug. 13, 2010.

(30) Foreign Application Priority Data

Aug. 13, 2009 (DE) .......................... 10 2009 037 080
Oct. 14, 2009 (DE) .......................... 10 2009 049 427

(51) Int. Cl.
*H01M 8/06* (2006.01)
*H01M 8/04* (2006.01)
*B01J 47/02* (2006.01)

(52) U.S. Cl.
CPC .......... *H01M 8/04044* (2013.01); *B01J 47/024* (2013.01); *Y02E 60/50* (2013.01)

(58) Field of Classification Search
CPC . H01M 8/04044; H01M 8/0267; H01M 8/06; H01M 8/04134
USPC ........................................................ 429/434
See application file for complete search history.

(56) References Cited

U.S. PATENT DOCUMENTS

| | | | |
|---|---|---|---|
| 2004/0170877 A1 | 9/2004 | Wakabayashi | |
| 2005/0106433 A1* | 5/2005 | Takemoto | 429/24 |
| 2005/0115883 A1* | 6/2005 | Takemoto et al. | 210/282 |
| 2005/0115884 A1* | 6/2005 | Suzuki et al. | 210/282 |
| 2008/0063902 A1 | 3/2008 | Kawasaki | |
| 2009/0068521 A1 | 3/2009 | Buchinger | |

FOREIGN PATENT DOCUMENTS

| | | |
|---|---|---|
| DE | 102005058987 A1 | 4/2007 |
| DE | 102008028051 A1 | 5/2009 |
| EP | 0542122 A1 | 5/1993 |
| JP | 0541234 A | 2/1993 |
| JP | 11321911 A | 11/1999 |
| JP | 2000185768 A | 7/2000 |
| JP | 2002280046 A | 9/2002 |
| JP | 2004311347 A | 11/2004 |
| JP | 2008099347 A | 4/2008 |
| WO | WO 2007/020489 * | 2/2007 |

OTHER PUBLICATIONS

PCT search report for PCT/EP2010/061808.

* cited by examiner

*Primary Examiner* — Stewart Fraser
*Assistant Examiner* — Olatunji Godo
(74) *Attorney, Agent, or Firm* — James Hasselbeck

(57) ABSTRACT

A cooling device (10) for a functional system, in particular a fuel cell system (12) for a motor vehicle is disclosed. The cooling device (10) includes a conduit system (14, 22) for a cooling fluid flow connected to the functional system (12) for cooling. A container (20) of the cooling device (10) for the cooling fluid is fluidically connected to the conduit system (14, 22). A treatment unit, in particular an ion exchanger (24), for treating the cooling fluid is fluidically connected to the conduit system (14, 22). The container (20) includes a receptacle chamber to receive the treatment unit (24) and/or an ion exchanger (24) disposed so as to stand upright in the container (20).

10 Claims, 14 Drawing Sheets

COOLING DEVICE FOR A FUNCTIONAL SYSTEM

CROSS REFERENCE TO RELATED APPLICATIONS

This application is a US bypass continuation application of international application No. PCT/EP2010/061808 having an international filing date of Aug. 13, 2010 and designating the United States, the International Application claiming a priority date of Aug. 13, 2009 based on prior filed German patent application No. DE 10 2009 037 080.3 and further claiming a priority date of Oct. 14, 2009 based on prior filed German patent application No. DE 10 2009 049 427.8. The entire contents of the aforesaid international application and the aforesaid German patent applications are incorporated herein by reference in their entirety.

TECHNICAL FIELD

The invention relates to a cooling device of a functional system, in particular of a fuel cell system of a motor vehicle filter. Moreover, the invention concerns a treatment unit, in particular an ion exchanger, for treating a cooling fluid of a cooling device of a functional system, in particular of a fuel cell system, in particular of a motor vehicle, that is fluidically connectable with a conduit system of the cooling device for the cooling fluid and with a container for the cooling fluid that is fluidically connected with the conduit system.

The invention concerns moreover a cooling fluid container, in particular a cooling fluid compensation container, of a cooling device of a functional system, in particular of a fuel cell system of a motor vehicle, that is fluidically connectable with a conduit system for a cooling fluid that is connected for cooling with the functional system, wherein the conduit system is connected fluidically with a treatment unit, in particular an ion exchanger, for treating the cooling fluid.

Moreover, the invention concerns an ion exchanger cartridge for treating a fluid, in particular a cooling fluid, comprising a cartridge cover and a granular ion exchange medium.

BACKGROUND OF THE INVENTION

It is known in the market to furnish fuel cell systems, internal combustion engines, and other functional systems that generate heat in mobile or stationary use with cooling circuits in order to keep them at an optimal temperature range for ensuring their function. In the cooling circuits, preferably liquid cooling media (i.e., cooling fluids) are circulated, in particular cooling water or mixtures of cooling water and glycol. In the cooling circuits, there are compensation containers for the liquid cooling medium. In order to ensure optimal cooling and service life of all components of the cooling circuit and of the functional system, it is known to treat the cooling medium in the cooling circuit with appropriate additional treatment units. It is known to employ filters and/or ion exchangers in the cooling medium circuit with which the cooling medium in operation can be purified or freed of undesirable ions. In particular in fuel cell systems, it is necessary that the cooling fluid is desalinated because otherwise there is the risk of short-circuiting due to the conductivity of the cooling fluid.

The treatment units increase however the space that is required for the cooling device, in particular because they should be accessible easily for servicing purposes. These conditions are not easily fulfilled in particular in case of use in motor vehicles where there is only limited mounting space available. JP 2004311347 A1 discloses a cooling system for a fuel cell system in which at the lower end of the cooling fluid compensation container a treatment unit in the form of an ion exchanger is arranged.

SUMMARY OF THE INVENTION

It is an object of the invention to design a cooling device, a treatment unit, a cooling fluid container, and an ion exchanger cartridge of the aforementioned kind that enable a treatment of the fluid in a simple and reliable way, that is optimal for the function of the fluid, in particular optimize the temperature and composition of the fluid, and are constructed as much as possible in a space-saving way.

This object is solved according to the invention in that the container has a receptacle for the treatment unit.

According to the invention, the treatment unit is thus integrated into the container in a space-saving way so that the container and the treatment unit together form a closed component. The shape of the container can be adjusted in a simple way to a mounting space that is available. The container with the treatment unit can be mounted at a location that is easily accessible so that the container and the treatment unit, in particular for servicing purposes, are easily accessible. Fluid connectors of the treatment unit are integrated into the container so that the total number of connectors can be reduced; this simplifies mounting. Separate lines from the treatment unit to the conduit system, as conventional in case of cooling devices of the prior art, can be omitted. By reducing the connectors and conduits that are positioned outside of the container, the risk of leakage is also reduced. The container and the treatment unit can be arranged at the cold side of the cooling device, in particular in flow direction of the cooling fluid in front of the functional system, or at the hot side of the cooling device, in particular in flow direction behind the functional system, or can be arranged in a bypass conduit. Advantageously, the cooling device can have a cooling fluid circuit in which the functional system is arranged. The container can also be part of a radiator, in particular a collector, so that the treatment unit is integrated into the radiator.

In an advantageous embodiment, the container can be a compensation container. The compensation container, frequently present in any case in a cooling device that is embodied as a cooling fluid circuit, can be arranged at the cold side of the cooling device so that the requirements with regard to temperature resistance of the treatment unit can be lowered. The treatment unit can thus be designed in a simpler and less expensive way.

In a further advantageous embodiment, the container can have a closable opening, in particular spatially on top, through which the treatment unit can be inserted into the interior of the container in particular so as to be exchangeable. In this way, a service-friendly exchange of exchangeable parts of the treatment unit or of the entire treatment unit is possible from above. This is in particular of great advantage when used in a motor vehicle where, as a result of the limited mounting space, for cooling devices known in the art the exchange of exchangeable parts of the treatment unit up to now has been possible only from below. For this purpose, the motor vehicle must be lifted or must be positioned above a pit and a bottom cover must be removed in order to access the exchangeable parts.

In a further advantageous embodiment, the treatment unit can have an ion exchanger, in particular an ion exchanger cartridge. By means of an ion exchanger in a simple and efficient way preferably by means of salt metathesis, partial desalination or complete desalination, in particular the conductivity of an aqueous coiling fluid can be reduced which is required in particular in case of fuel cell systems. Also, ion exchangers can be used that are suitable for softening aqueous cooling fluid in order to reduce, or prevent entirely, calcium deposits in the cooling device. Ion exchanger cartridges can be simply exchanged.

Advantageously, the ion exchanger can have a pressing device for compressing a granular ion exchanger medium. As a result of the pressing action, it is prevented that the cooling fluid upon passing through the ion exchanger forms preferred flow passages which would lead to non-uniform loading of the ion exchanger medium and to a shortened service life. The pressing device can preferably comprise a pressure disk that is loaded by a pretensioned spring. The spring can be arranged preferably such that it does not contact the cooling fluid so that corrosion or other type of chemical reaction with the material of the spring is prevented.

Moreover, advantageously the container and/or the treatment unit can have at least one component, in particular a jacket for the treatment unit that determines flow of the cooling fluid through the treatment unit. In this way it is ensured that the cooling fluid passes through the treatment unit and is appropriately treated.

In order to prevent that the cooling fluid upon movement of the container will splash back and forth, advantageously baffle devices or splash guard devices can be provided in the container, in particular baffle plates or baffle ribs, for the cooling fluid. This is of great advantage particularly in case of use in motor vehicles in which the container is moved during travel.

The container, in particular the compensation container, can be located in a bypass conduit that is fluidically connected with a main conduit system for cooling the fuel cell system. For controlling the flow of the cooling fluid through the bypass conduit and the compensation container, a thermovalve can be arranged in the main conduit system.

The object is further solved according to the invention in that the treatment unit is designed such that it is arranged in an appropriate receptacle of the container. The above described advantages of the cooling device apply likewise to the treatment unit.

In an advantageous embodiment, the treatment unit can comprise an ion exchanger, in particular an ion exchanger cartridge that comprises a pressing device for compressing a granular ion exchange medium.

The object is solved according to the invention also in that the cooling fluid container, in particular the cooling fluid compensation container, has a receptacle for integration of the treatment unit and/or an ion exchanger that is arranged upright in the container. The aforementioned advantages of the cooling device apply likewise to the cooling fluid container.

In this connection, the cooling fluid compensation container for the fuel cell system or the fuel cell device of a motor vehicle can be designed for flow of cooling medium therethrough which is provided for cooling the fuel cell device. The cooling medium compensation container can comprise a treatment unit in the form of an ion exchanger that is arranged upright in the container.

With this specific positioning of the ion exchanger in the container, an improved accessibility and manipulation can be achieved with respect to installation of the cooling medium compensation container in the fuel cell system and thus also in the vehicle. This is particularly advantageous in particular for mounting purposes, for testing purposes and the like.

Moreover, with the upright positioning of the ion exchanger unit or the ion exchanger also its functionality with respect to effectiveness of the ion exchange material or ion exchange medium can be improved. Many vulnerable connecting locations between the ion exchanger insert or ion exchanger cartridge and the cooling medium circuit that may cause a leak, can be designed in this respect to be less critical. Moreover, a compact configuration minimized with respect to mounting space can be achieved. In particular, the upright arrangement of the ion exchanger also enables improved purification of the cooling medium with respect to removal of metal ions from the cooling medium.

The liquid cooling medium of a fuel cell system must be usually as pure as possible, primarily with regard to metal ions because they can poison the PEM (proton exchange membrane) and/or the catalyst layers of the PEM fuel cells. For this purpose, usually an ion exchanger cartridge is integrated into the cooling medium circuit. The ion exchange capacity of the ion exchange material however decreases over time so that the ion exchanger cartridge must be exchanged regularly. For this purpose, it should be arranged at a location that is as easily accessible as possible. By integration of the ion exchanger into the container and moreover by the specific positional orientation the effectiveness of the ion exchange material can be improved.

With the construction according to the invention, advantageously a longer residence time of the liquid cooling medium in the ion exchanger cartridge can be achieved. In this way, the contact time of the cooling medium with the ion exchanger medium is extended so that the efficiency of the ion exchange is improved. The purification effect is improved thereby so that the cooling medium becomes even more pure. Moreover, the exchangeability of the ion exchanger cartridge is improved significantly. No cooling medium must be drained and the ion exchanger cartridge can be removed in a simple way so that the problem of introduction of harmful contaminants into the cooling circuit can be avoided. With the construction according to the invention of the cooling medium compensation container with the specific positioning of the ion exchanger unit or the ion, this unit can be removed and replaced comfortably and efficiently exchanger without draining the cooling medium and the introduction of contaminants into the cooling circuit can be at least reduced or even avoided as much as possible.

By the integration and the thus eliminated interfaces, a simpler and more reliable mounting process is provided so that leaks in the cooling system are prevented. A guided locking action of the ion exchanger prevents moreover a possible sliding and ensures full functionality. Especially this type of a specific no-destruction detachable connection in the form of a locking action enables the position-stable attachment while still providing simple separation of the ion exchanger from the cooling medium compensation container.

In this context, an upright connection of the ion exchanger in the container is understood as positioning such that the longitudinal axis of the ion exchanger is arranged maximally at an angle of 45 degrees relative to the longitudinal axis of the cooling medium compensation container. In particular, and in an especially preferred arrangement, it is provided that the longitudinal axis of the cooling medium compensation container and the longitudinal axis of the ion exchanger are arranged parallel or coaxial so that the ion exchanger is arranged vertically in the cooling medium compensation container. The aforementioned advantages can thus be achieved in a special way. Moreover, with this upright, in particular vertical, arrangement of the ion exchanger, washing out of the ion exchange material can be avoided and in this way the effectiveness of the ion exchanger can be improved. In particular by vertical positioning of the ion exchanger and flow of the cooling medium through the ion exchanger preferably from bottom to top, but optionally also from top to bottom, the residence time and thus the exchange of ions from the cooling medium into the ion exchange material is improved. By reduction of the interfaces and the integration of two components into one component, advantages with respect to mounting, servicing, and maintenance work and weight advantages are provided. Because the locking action of the ion exchanger cartridge it can be mounted quickly and without further securing means and withstands without problems even vehicle-typical vibrations (shaking) without becoming loose or sliding.

By locking of the insert or cartridge at a defined interface in the compensation container, moreover mounting parts such as screws and hose clamps are no longer needed.

Up to now, in known configurations the ion exchanger inserts or cartridges have been arranged horizontally within the vehicle which has caused channel formation, washing out and destruction of the ion exchange material of the cartridge. This has the result that the cooling medium seeks the path of least resistance through the cartridge and flows through the ion exchanger without exchange of ions into the ion exchange material. By an upright, in particular vertical, arrangement of the ion exchanger in accordance with the invention, this gravity effect is not noticeable. Preferably, the compensation container is positioned always as far as possible at the top within the vehicle for physical reasons in order to ensure a venting function. With the easy accessibility is also enabled that the servicing part in the form of the ion exchanger is comfortably accessible from above and can be exchanged without other components having to be demounted.

In one embodiment, the cooling fluid container has at its upper end (laterally at the top) an outlet opening for discharging the cooling fluid from the collecting chamber.

In a further embodiment, the cooling fluid container has a cover for removal and installation of the ion exchanger; the cover has a spring in order to act on an upper wall of the ion exchanger. In this way, the ion exchanger can be further fixed in order to secure it even better with respect to sliding as a result of shaking or the like.

The spring of the cover for removal and installation of the ion exchanger can also fulfill the additional function of compression of the ion exchange medium.

In one embodiment, the cooling fluid container has a refill socket for refilling cooling fluid. The refill socket can be closeable by a screw closure which is provided with a pressure compensation system.

In one embodiment, the screw closure for closing the refill socket can be integrally connected with an ion exchanger cartridge, for example, in such a way that the screw closure by exchanging the ion exchanger cartridge is exchanged together with the latter.

In a further embodiment, the cooling fluid container has a filling level sensor, preferably provided with a float. A connector of the filling level sensor can be arranged so as to be accessible from the exterior at the bottom of the compensation container.

The object is finally solved according to the invention by the ion exchanger cartridge with a pressing device for compressing the ion exchange medium. This has the advantage that the ion exchange medium is uniformly compressed and the formation of preferred flow passages is prevented. The ion exchange medium is uniformly flowed through by the fluid to be treated; this increases the ion exchange efficiency and the service life. In this way, the ion exchanger cartridge can be configured to be compact and space-saving.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

In the above Figures, same components are provided with the same reference characters.

Figure 1:
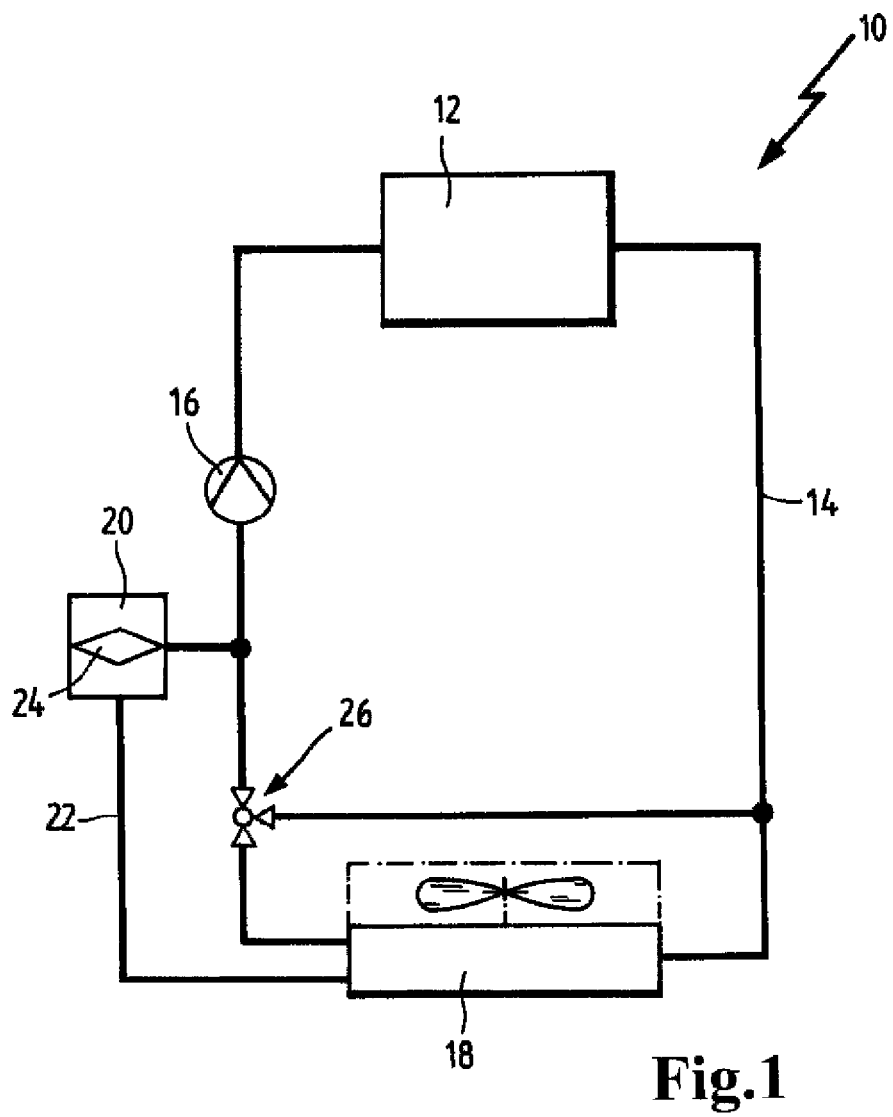
FIG. 1 schematically depicts a cooling circuit of a fuel cell system of a motor vehicle with a compensation container in which an ion exchanger cartridge is integrated.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a cooling device for a fuel cell system. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

In FIG. 1, a cooling circuit 10 of a fuel cell system 12 of a motor vehicle is illustrated. The fuel cell system 12 may comprise one or several fuel cells.

The cooling circuit 10 comprises a main conduit system 14 for a cooling fluid which is comprised of cooling water or an aqueous cooling fluid mixture. The main conduit system 14 is connected with the fuel cell system 12 for cooling. In the main conduit system 14 there is moreover a pump 16 for the cooling fluid and a heat exchanger 18 in the form of a radiator.

The cooling circuit 10 comprises moreover a compensation container 20 for cooling fluid that is illustrated in detail in FIGS. 2 to 6. The compensation container 20 is located in a bypass conduit 22 that is fluidically connected with the main conduit system 14. In the compensation container 20 an ion exchanger cartridge 24 for treating the cooling fluid is integrated. With the ion exchanger cartridge 24 the conductivity of the cooling fluid is reduced. In the main conduit system 14, a thermovalve 26 is arranged. By means of the thermovalve 26 the flow of the cooling fluid through the bypass conduit 22 and the compensation container 20 is controlled in a way that is of no importance in this context.

Figure 5:
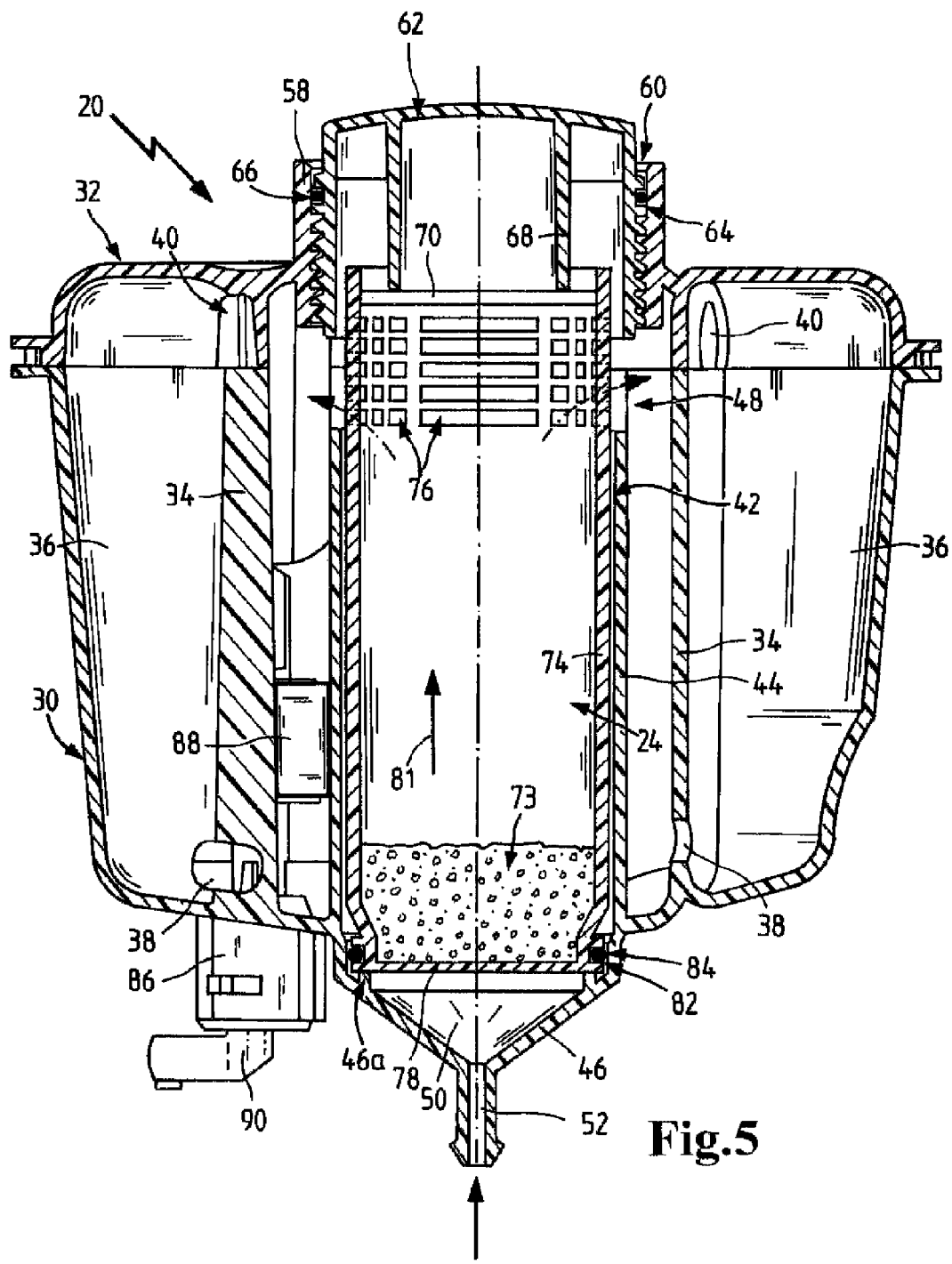
FIG. 5 schematically depicts a longitudinal section of the compensation container of FIG. 2 along the line V-V indicated therein.

The compensation container 20 illustrated in section in FIG. 5 comprises a base part 30 that is seal-tightly closed off by a cover part 32. The cover part 32 is welded to the base part 30.

Figure 6:
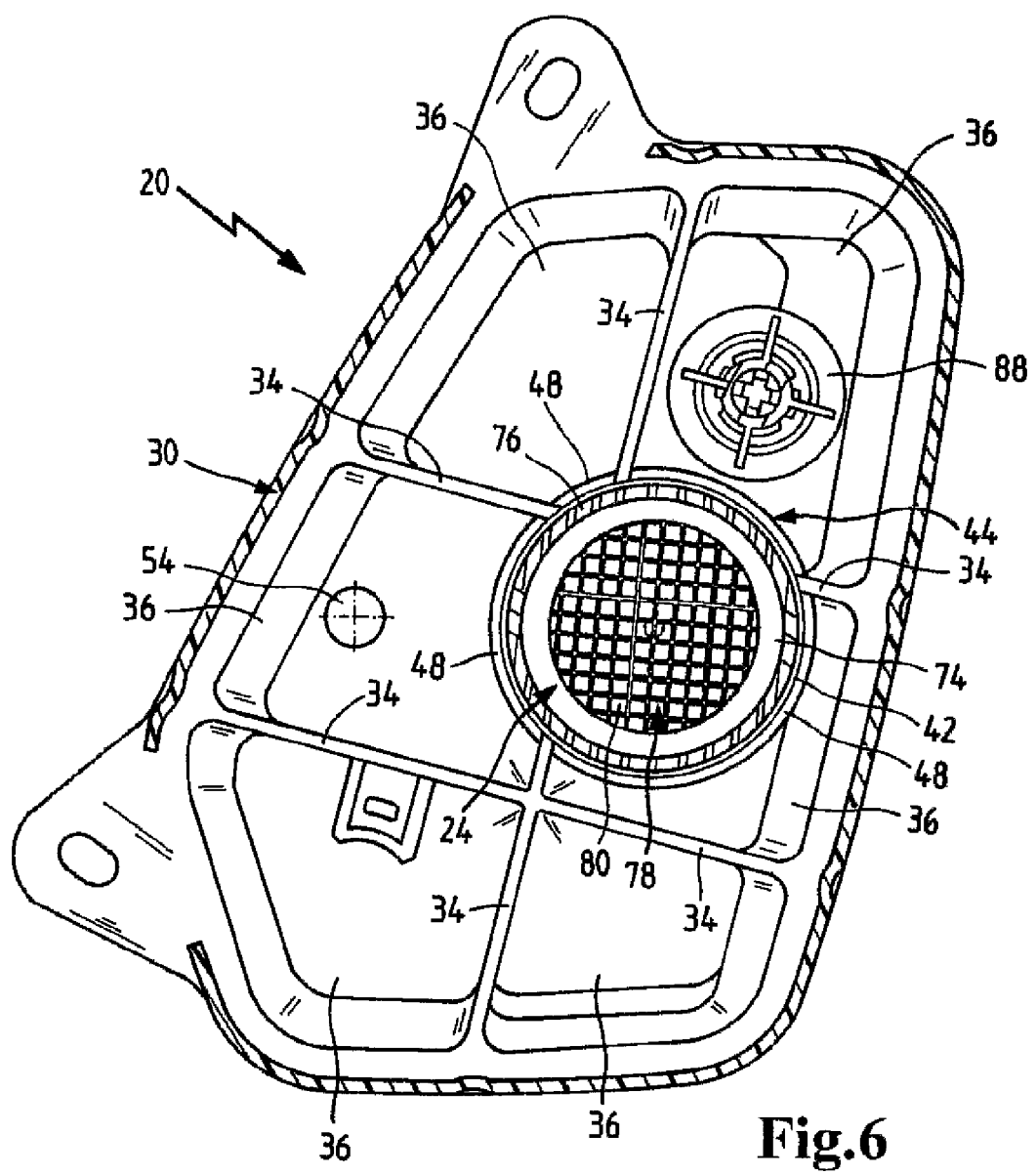
FIG. 6 schematically depicts a cross-section of the compensation container of FIG. 2 along the line VI-VI indicated therein.

In the compensation container 20 baffle plates 34 for the cooling fluid are arranged that divide the compensation container 20, as shown in FIG. 6, into six chambers 36. The baffle plates 34 prevent that the cooling fluid splash back and forth when the compensation container 20 moves. The baffle plates 34 have in the lower area through openings 38 through which the cooling fluid can flow between the chambers 36. In the upper areas, the baffle plates 34 have compensation openings 40 through which air can flow between the chambers 36 in particular for pressure compensation.

In a receptacle chamber 42 of the compensation container 20 the ion exchanger cartridge 24 is arranged. The receptacle chamber 42 is delimited by an inner cylinder 44 into which the ion exchanger cartridge 24 is inserted. The inner cylinder 44, as shown in FIG. 5, is connected circumferentially seal-tightly with the bottom of the compensation container 20. The bottom of the compensation container 24 also forms a chamber bottom 46 of the receptacle chamber 42. The upper rim of the inner cylinder 44 is free so that here connecting openings 48 to the chambers 36 of the compensation container 20 that adjoin the inner cylinder 44 are realized. The stepped chamber bottom 46 that as a whole is funnel-shaped delimits an inflow space 50 into which an inlet socket 52 opens. The inlet socket 52 is connected to the bypass line 22 for supply of cooling fluid into the compensation container 20. On the inner side of the chamber bottom 46 that is facing the ion exchanger cartridge 24 a support ring that is coaxial to the inner cylinder 44 is integrally formed where the inner cartridge 24 is supported in axial direction.

The baffle plates 34, the inner cylinder 44, and the base part 30 are preferably formed monolithically, preferably of plastic material.

The ion exchanger cartridge 24 is fluidically connected by means of inflow space 50 and the inlet socket 52 with the bypass line 22.

Figure 2:
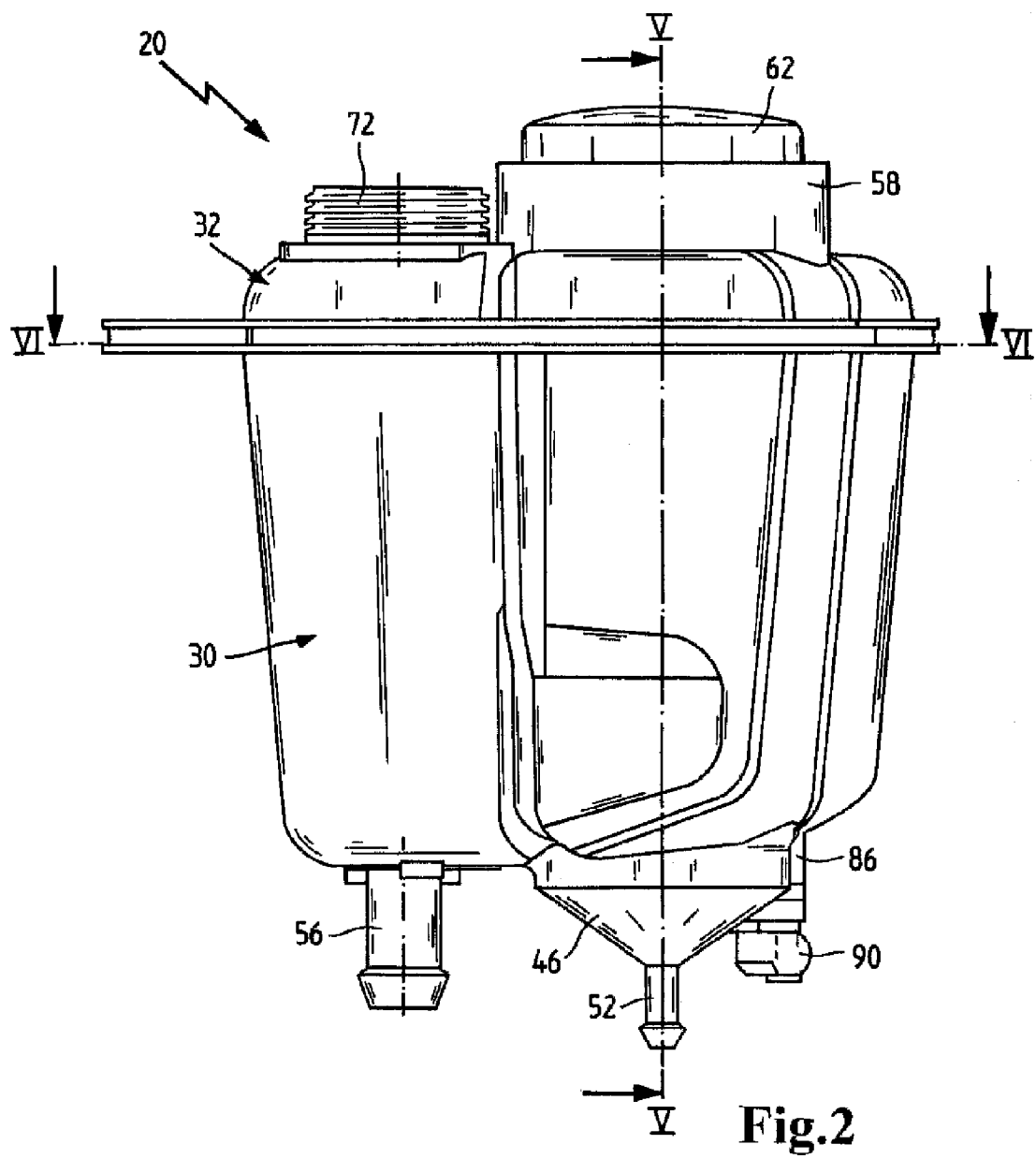
FIG. 2 schematically depicts a first side view of a first embodiment of a compensation container with ion exchanger cartridge as they are used in the cooling circuit of FIG. 1.
Figure 3:
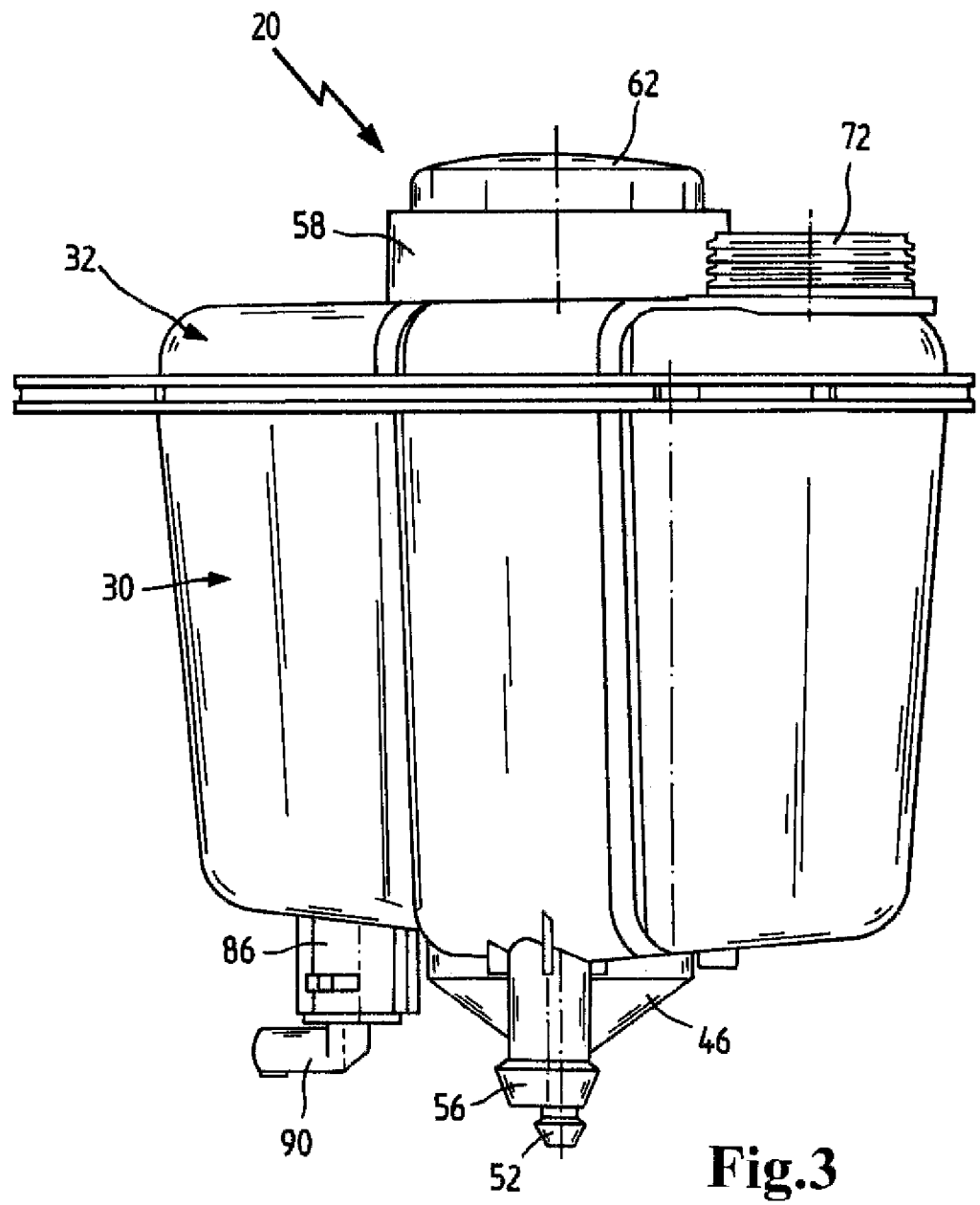
FIG. 3 schematically depicts a second side view of the compensation container of FIG. 2.
Figure 4:
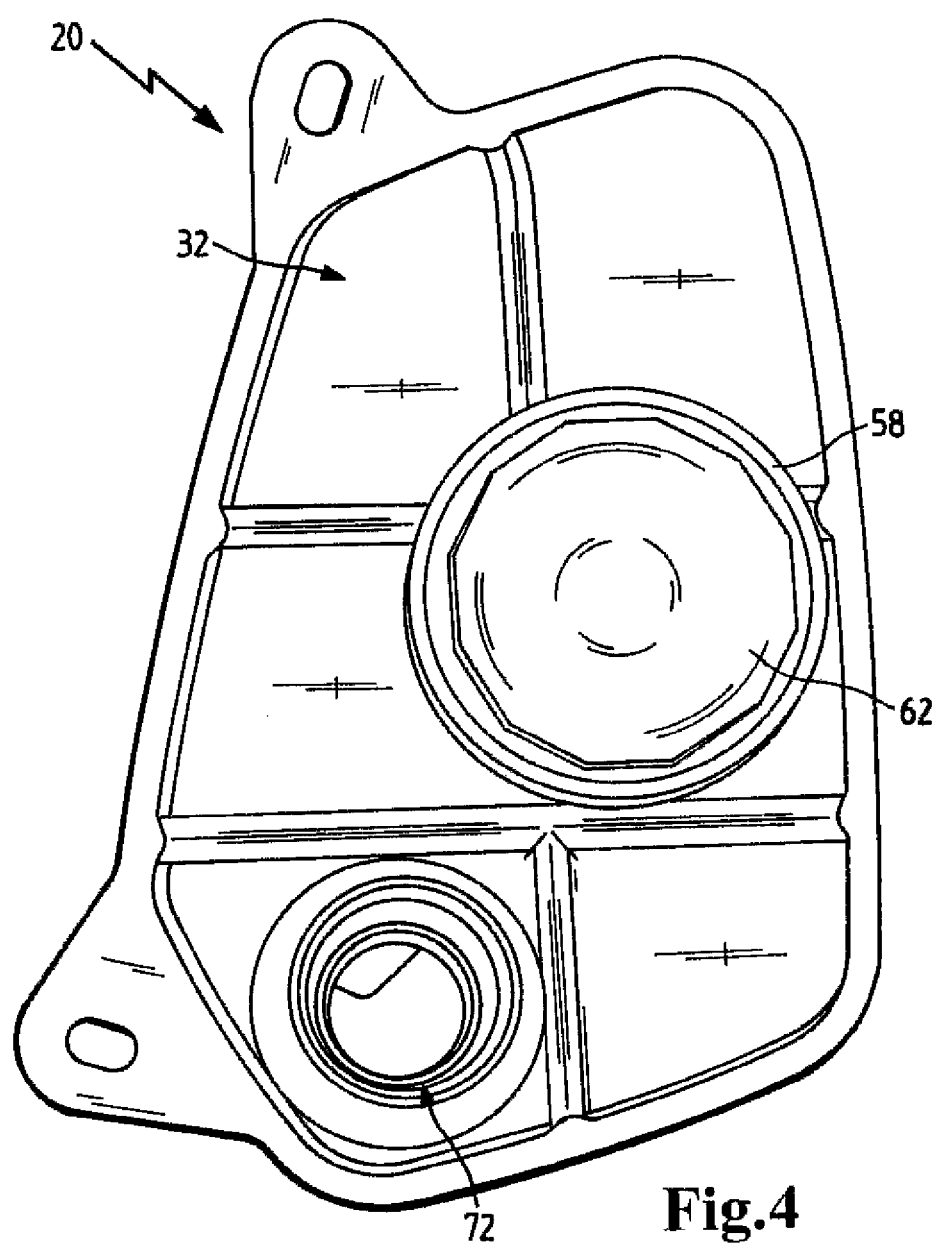
FIG. 4 schematically depicts a view of the compensation container of FIG. 2 at a slant from above.

Adjacent to the receptacle chamber 42 in the bottom of the compensation container 20 an outlet opening 54 is arranged that is illustrated in FIG. 6 and that is surrounded on the exterior side of the compensation container 20 by an outlet socket 56 illustrated in FIGS. 2 and 3. The outlet socket 56 is connected to the bypass conduit 22 for discharging cooling fluid out of the compensation container 20.

The compensation container 20 has spatially on top at the cover part 32 a receptacle socket 58 with a receptacle opening 60 that is coaxial to the inner cylinder 44 of the receptacle chamber 42. Through the receptacle opening 60 the ion exchanger cartridge 24 can be introduced into the receptacle chamber 42 of the compensation container 20 and can be easily exchanged. The receptacle socket 58 has an inner thread into which for closing the receptacle opening 60 a cup-shaped receptacle socket 62 with an outer thread is screwed in. The receptacle cover 62 has a circumferential sealing groove 64 with an annular seal 66 that seals the receptacle cover 62 relative to the receptacle socket 58. The open end face of the receptacle cover 62 is facing the interior of the compensation container 20. In the interior of the receptacle cover 62, a hollow push cylinder 68 extending in axial direction is attached, preferably monolithically with the receptacle cover 62, whose free rim upon screwing in the receptacle cover 62 axially relative to the inner cylinder 44 presses against a pressure disk 70 of the ion exchanger cartridge 24.

Adjacent to the receptacle socket 58 on the cover part 32 a refill socket 72 for refilling cooling fluid is arranged. The refill socket 72 is closable with a screw closure that is not shown in the FIGS. 1 to 6 and that comprises pressure compensation means that are not of interest in this context.

The ion exchanger cartridge 24 is filled with ion exchange granules 73 that are only schematically indicated in FIG. 5 and whose function will not be explained any further in this context. The ion exchanger cartridge 24 has a jacket 74 that has outlet openings 76 for the cooling fluid in the upper area. The outlet openings 76 are aligned with the connectors 48 of the inner cylinder 44. A cartridge bottom 78 of the ion exchanger cartridge 24 has inlet openings 80 illustrated in FIG. 6 through which the cooling fluid can flow out of the inflow space 50 into the interior of the ion exchanger cartridge 24.

The cooling fluid must flow through the ion exchange granules 73 from bottom to top in the direction of arrow 81 and is treated therein. It can only exit from the ion exchanger cartridge 24 through outlet openings 76. In this way, the flow of the cooling fluid through the ion exchanger cartridge 24 is predetermined. From the outlet openings 76, the treated cooling fluid flows through the connecting openings 48 into the chambers 36. From here, the cooling fluid flows through outlet opening 54 and outlet socket 56 into the bypass conduit 22b.

The inner cylinder 44 surrounds the ion exchanger cartridge 24 additionally. When using an alternative ion exchanger cartridge, not illustrated, with fluid-permeable, for example, grid-like jacket, the inner cylinder 44 determines the flow of the cooling fluid through the ion exchanger cartridge in that it prevents that the cooling fluid already in a lower area of the ion exchanger cartridge 24 can exit from it through the jacket without having passed through all of the ion exchange granules 73.

In the area of the cartridge bottom 78, the jacket 74 is stepped and is matched to the shape of the chamber bottom 46. The jacket 74 has a circumferential sealing groove 82 with an annular seal 84. The annular seal 84 seals the jacket 74 radially against an area that extends at the chamber bottom 46 in axial direction.

At its upper end face the ion exchanger cartridge 24 is closed off by means of the pressure disk 70 that is slidable in axial direction within the jacket 74 of the ion exchanger cartridge 24. Upon screwing in the screw closure 62, the pressure disk 70 is forced by the push cylinder 68 in axial direction and compresses the ion exchange granules 73. In this way, it is prevented that the cooling fluid will form preferred flow passages within the ion exchange granules 73.

The compensation container 20 moreover comprises a filling level sensor 86 with a float 88 illustrated in FIGS. 5 and 6. A connector 90 of the filling level sensor 86 illustrated in FIGS. 2, 3 and 5 is arranged, accessible from the exterior, at the bottom of the compensation container 20.

Figure 7:
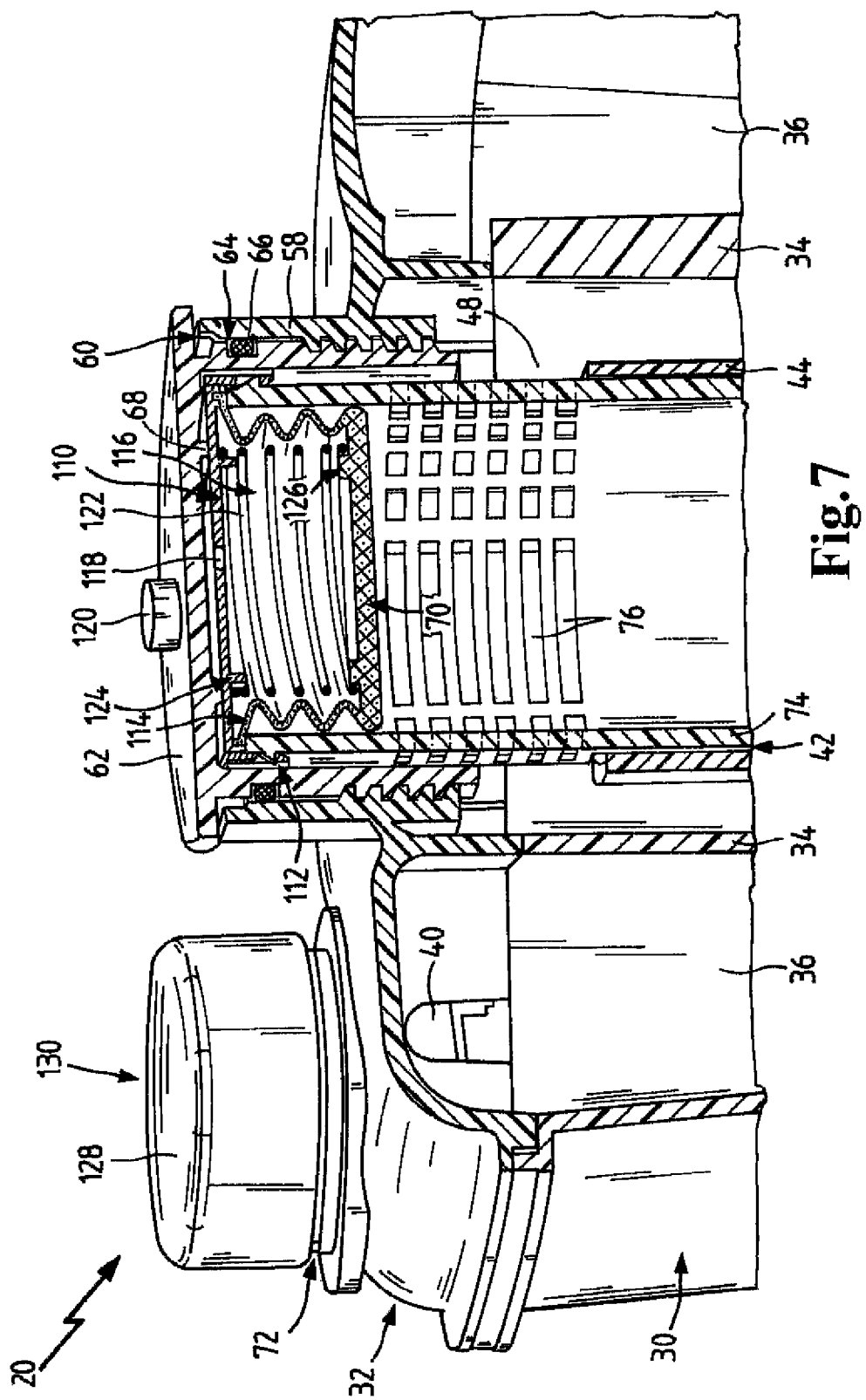
FIG. 7 schematically depicts a longitudinal section of a detail of a second embodiment of a compensation container with ion exchanger cartridge as they are used in connection with the cooling circuit of FIG. 1.

In a second embodiment, illustrated in FIG. 7, those elements that are similar to those of the first embodiment illustrated in FIGS. 1 to 6 are provided with the same reference characters so that with respect to their description reference is being had to the explanations regarding the first embodiment. This embodiment differs from the first one in that a cartridge cover 110 is provided that, by means of snap connections 112, is fixedly plugged onto the jacket 74 of the ion exchanger cartridge 24.

The snap connections 112 comprise locking noses and locking eyes interacting in pairs. The locking noses are located on the radial outer circumferential side of the jacket 74. The locking eyes are arranged on the rim area of the cartridge cover 110. The push cylinder 68 of the screw closure 62 in axial direction is shorter than in the first embodiment. The free rim of the push cylinder 68 engages the cartridge cover 110 and forces in this way the entire ion exchanger cartridge 24 in axial direction into the receptacle chamber 42.

On the inner side of the cartridge cover 110 that is facing the interior of the ion exchanger cartridge 24, the pressure disk 70 is attached by means of an elastic, approximately hollow cylindrical folded bellows 114. The folded bellows 114 is coaxial to the jacket 74. It enables an axial movement of the pressure disk 70 within the jacket 74. The pressure disk 70 and the folded bellows 114 can be monolithic or can be combined of several components.

The free rim of the folded bellows 114 is attached to a groove of the cartridge cover 110 and is clamped seal-tightly between the cartridge cover 110 and the free rim of the jacket 74. The cartridge cover 110, the folded bellows 114, and the pressure disk 70 delimit a spring chamber 116. The spring chamber 116 is seal-tightly closed relative to the interior of the ion exchanger cartridge 24 so that no cooling fluid can pass into the spring chamber 116. The cartridge cover 110 has a pressure compensation opening 118 to the interior of the push cylinder 68. The receptacle cover 62 comprises an engagement cylinder 120 that can be engaged by a special tool for opening and closing the cartridge cover 110. In this way, unauthorized opening of the cartridge cover 110 is made difficult. In the spring chamber 116 a spiral pressure spring 122 is arranged that is coaxial to the jacket 74. The spiral pressure spring 122 is supported with one end on the inner side of the cartridge cover 110 and with the other end on the side of the pressure disk 70 that is facing the cartridge cover 110. For centering the spiral pressure spring 122, annular guide collars 124 and 126 are arranged on the inner side of the cartridge cover 110 and on the corresponding side of the pressure disk 70, respectively.

The pressing device with the cartridge cover 110, the pressure disk 70, and the spiral pressure spring 122 has the effect that the compression is automatically readjusted, for example, as soon as the ion exchange granules 73 settle.

In FIG. 7, the refill socket 72 is illustrated as being closed with screw closure 128. Screw closure 128 has a pressure compensation system 130.

Figure 8:
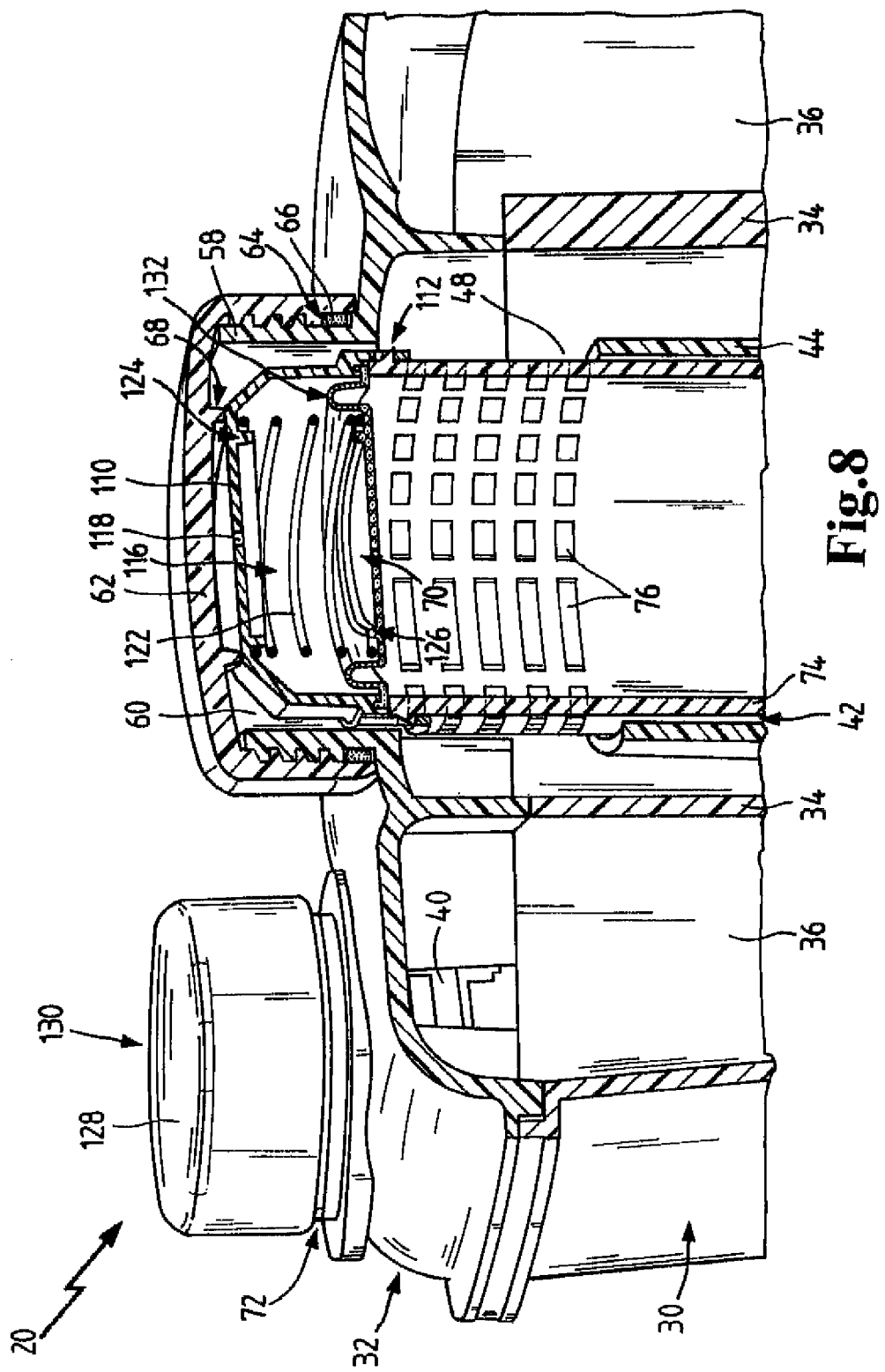
FIG. 8 schematically depicts a longitudinal section of a detail of a third embodiment of a compensation container with ion exchanger cartridge as they are used in the cooling circuit of FIG. 1.

In a third embodiment, illustrated in FIG. 8, those elements that are similar to those of the second embodiment illustrated in FIG. 7 are provided with the same reference characters so that with respect to their description reference is being had to the explanations of the second embodiment. This embodiment differs from the second one in that the receptacle socket 58 has an outer thread and the receptacle cover 62 has an inner thread and the receptacle cover 62 is screwed onto the receptacle socket 58.

The cartridge cover 110 is of a cup-shaped configuration wherein the spiral pressure spring 122 is supported with one end in a depression at the bottom of the cartridge cover 110. The pressure disk 70 comprises an outer movable rim area 132 that is curved in profile in a semi-circular shape relative to the spring chamber 116. The movable rim area 132 is attached with its radial outer rim in a groove in the end face of the rim of the cartridge cover 110 and is seal-tightly clamped between the end face rim of the jacket 74 and the end face rim of the cartridge cover 110. The movable rim area 132 enables in analogy to the folded bellows 114 of the second embodiment a movability of the pressure disk 70 axially relative to the ion exchanger cartridge 24, wherein the spring chamber 116 is closed seal-tightly relative to the interior of the ion exchanger cartridge 24.

Figure 9:
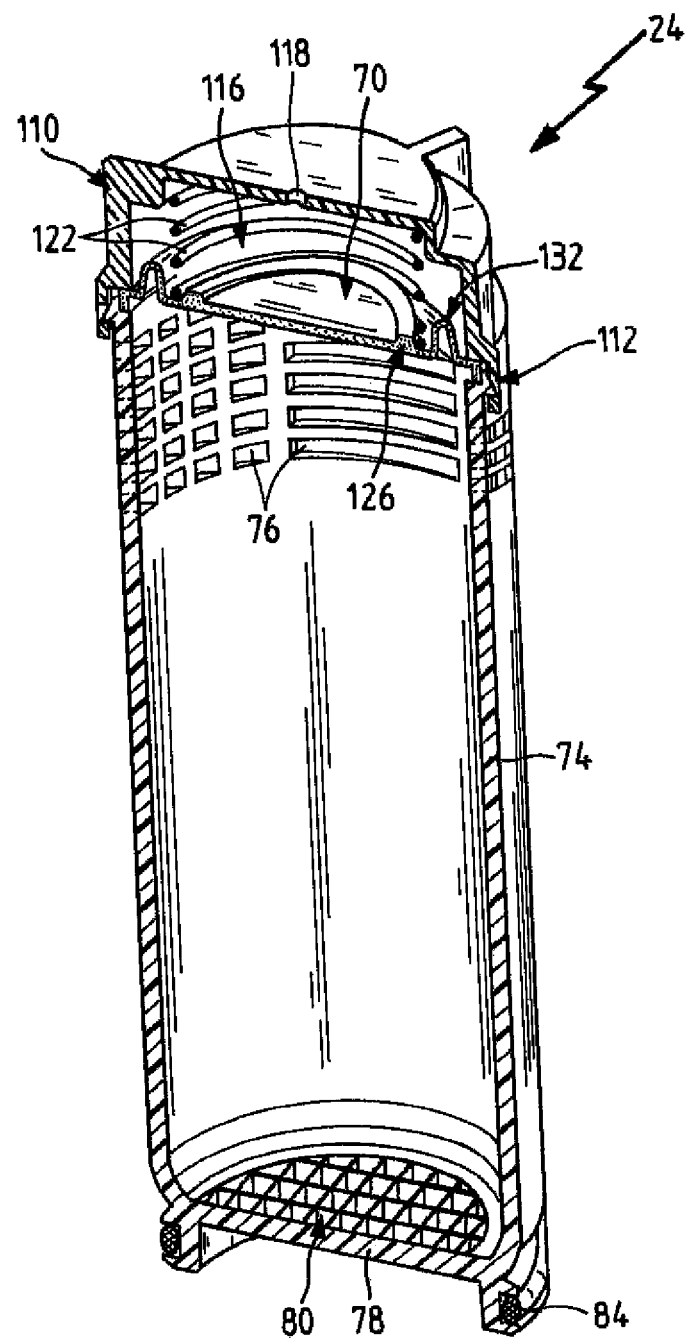
FIG. 9 schematically depicts an isometric illustration of an ion exchanger cartridge that is similar to the ion exchanger cartridge of FIG. 8.
Figure 10:
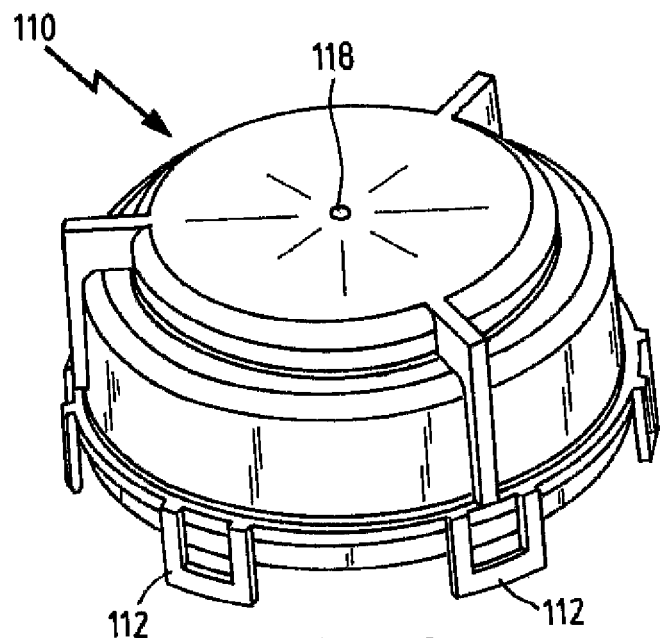
FIG. 10 schematically depicts a cartridge cover of the ion exchanger cartridge of FIG. 9.
Figure 11:
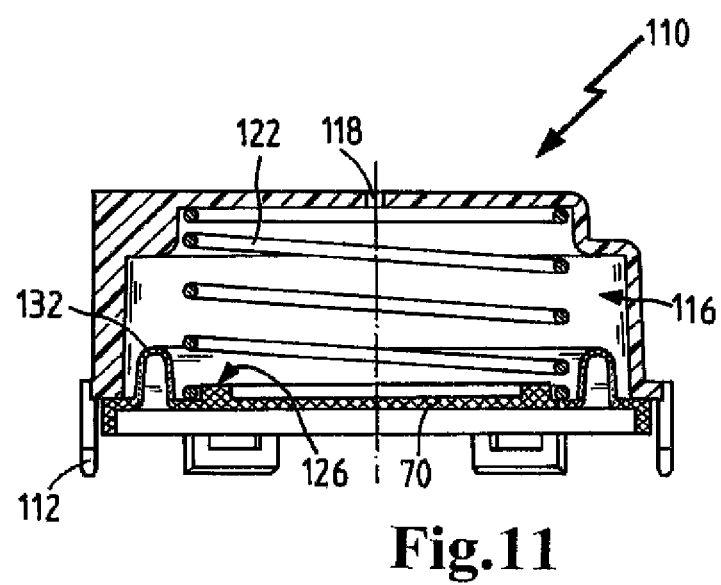
FIG. 11 schematically depicts a section of the cartridge cover of FIGS. 9 and 10.

In FIGS. 9 to 11, an ion exchanger cartridge 24 with a cartridge cover 110 is shown that is similar to the ion exchanger cartridge 24 of the third embodiment of FIG. 8. In the cartridge cover 110 of FIGS. 9 to 11 on the end face of its rim there is no groove provided for the outer rim of the movable rim area 132.

Figure 12:
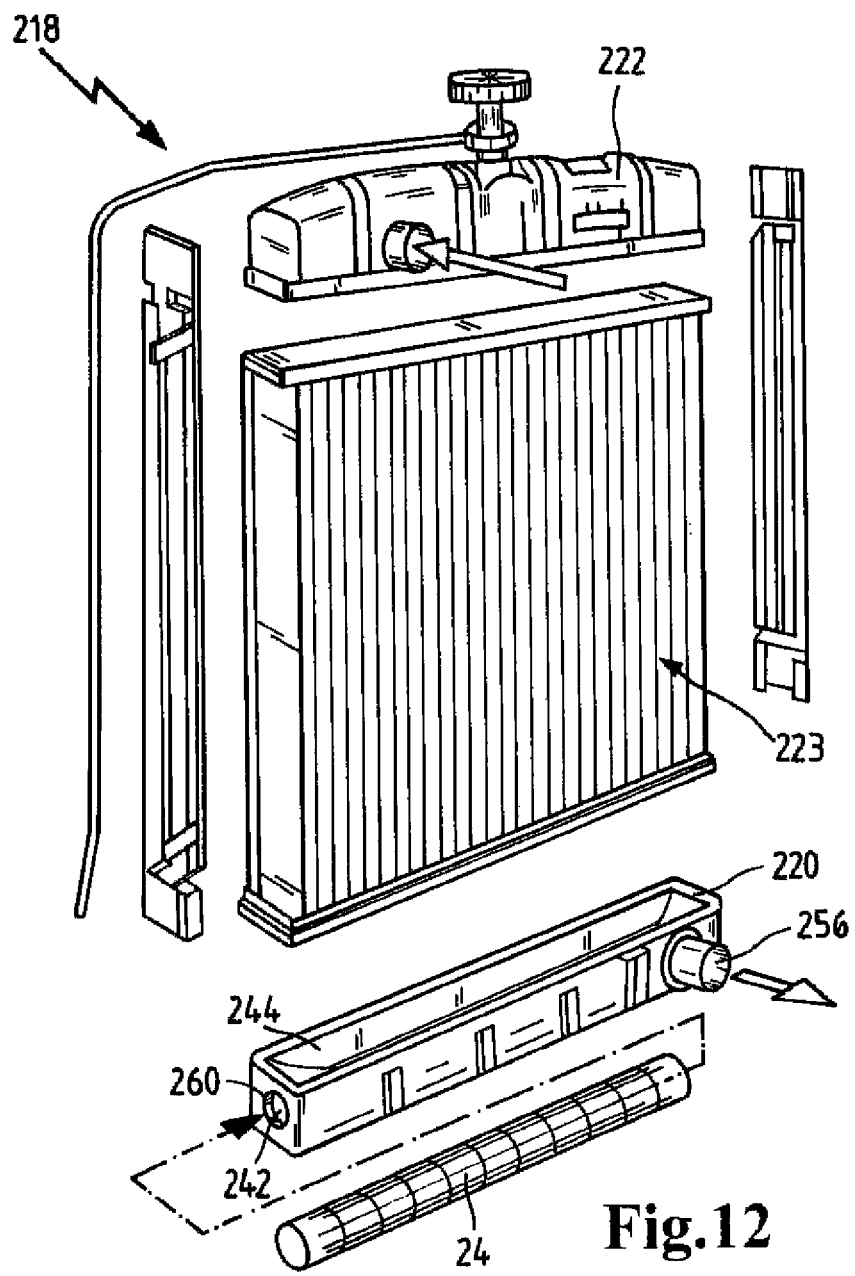
FIG. 12 schematically depicts an exploded view of a radiator having a collector in which an ion exchanger cartridge is arranged.

In FIG. 12, a radiator 218 of a cooling circuit, not shown otherwise and is similar to that of FIG. 1, is illustrated in an exploded illustration. The radiator 218 comprises in FIG. 12 at the top a distributor 222 with an inflow socket for cooling fluid. In FIG. 12, a collector 220 of the radiator 218 is illustrated at the bottom that comprises a discharge socket 256 for the cooling fluid. Between the distributor 222 and the collector 220 a cooling member 223 is arranged. The collector 220 is a container in the meaning of the invention. In the collector 220, an inner cylinder 244 is arranged that is open at both end faces. The inner cylinder 244 serves as a receptacle 242 for the ion exchanger cartridge 24 whose jacket in this embodiment is of a continuous grid shape. The collector 220 has at one side a closeable opening 260 through which the ion exchanger cartridge 24 can be pushed into the inner cylinder 244.

Instead of the collector 220 also any other area of a radiator that is suitable to provide a receptacle for the ion exchanger cartridge 24 can be considered as a container in the meaning of the invention.

Figure 13:
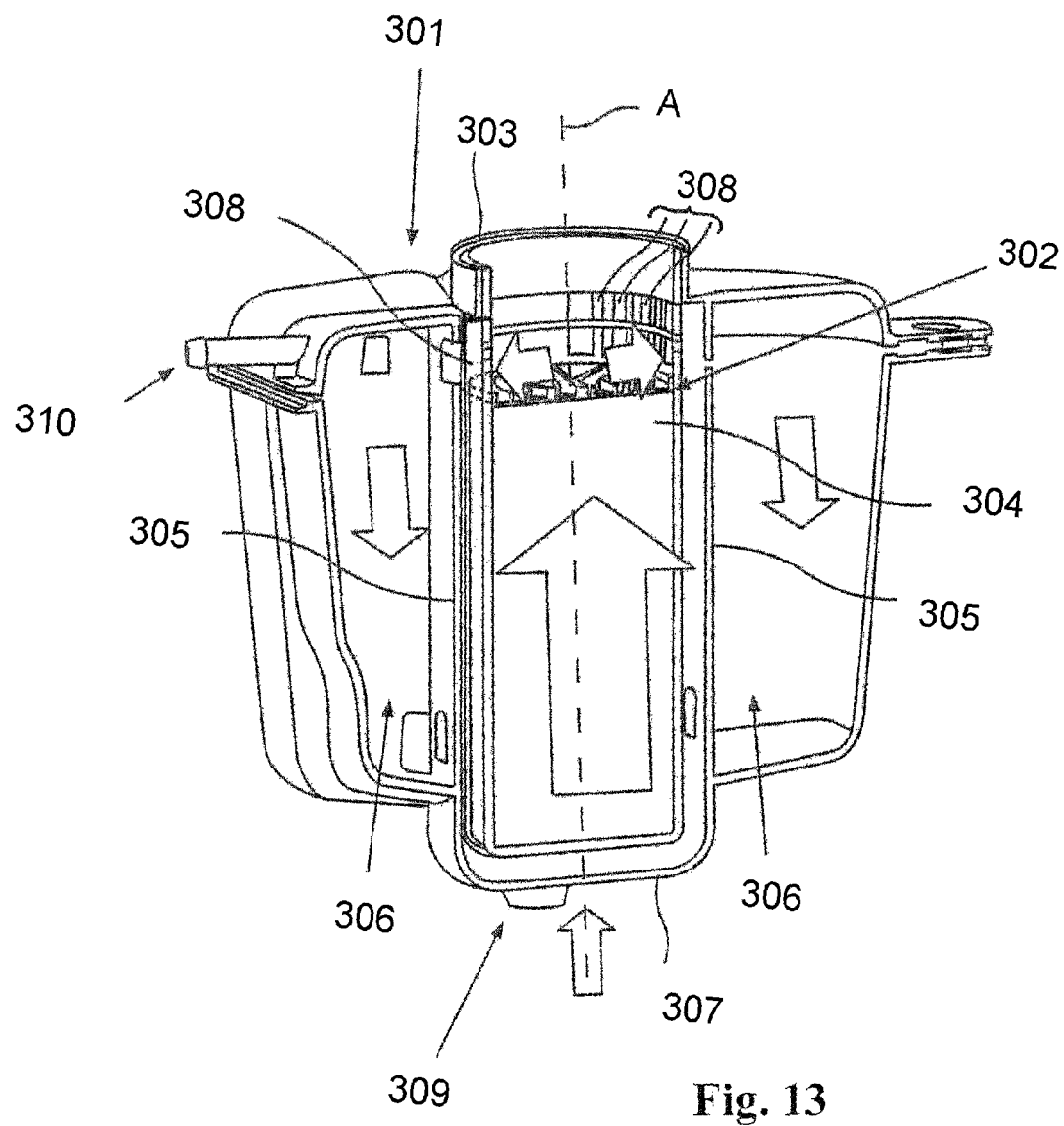
FIG. 13 is a section illustration of an embodiment of a cooling medium compensation container.

FIG. 13 shows a further embodiment in which the compensation container 301 is arranged in a fuel cell system of a motor vehicle. The compensation container 301 is arranged in a cooling medium circuit of this fuel cell system and (liquid) cooling medium or cooling fluid used for cooling the fuel cells of the fuel cell system flows through this cooling medium compensation container. As the cooling medium passes through, contaminants such as metal ions are removed from the (liquid) cooling medium.

For this purpose, the cooling medium compensation container 301 comprises an ion exchanger 302 or an ion exchanger unit that is integrated into the container 301 and is insertable and removable in a detachable non-destructive way into and from the container 301. In particular, for this purpose a mechanical means for locking the ion exchanger 302 is provided.

The locking action can be provided by simple locking hooks or locking clips. Also, strips provided with locking projections and extending in radial direction circumferentially about the ion exchanger 302 can be provided.

The container 301 has a longitudinal axis A wherein substantially centrally a receptacle chamber 303 is formed into which the ion exchanger 302 can be introduced. The ion exchanger 302 is embodied as an elongate cylinder-shaped insert or cartridge and comprises an ion exchange material 304 (for example, a suitable ion exchange resin) which is contained in the ion exchanger 302. The ion exchange material can be provided as loose bulk material in the ion exchanger 302. The bulk material is then secured solely by the action of gravity at the bottom of the ion exchanger 302 and withstands thus as a result of its weight an undesirable washing out as a result of the cooling medium flow out of the ion exchanger 302. This embodiment is technically especially simple and moreover inexpensive. Should it be required, the bulk material can also be retained, for example, by means of a screen, frit, fiberglass pads or the like. In the illustrated embodiment, the ion exchanger 302 is arranged vertically in the container 301; this means that the axis A corresponds to the longitudinal axis of the ion exchanger 302 and therefore a coaxial arrangement of the axes of the ion exchanger 302 and of the container 302 is provided.

Adjacent to the receptacle chamber 303 that is laterally delimited by vertical walls 305, the container 301 also has a collecting chamber 306 where the purified cooling medium is collected and returned into the cooling circuit. The collecting chamber 306 surrounds thus in an annular shape the receptacle chamber 303. Bottom 307 of the receptacle chamber 303 forms at the same time also the bottom of the container 301. The bottom 307 has an inlet opening 309 that is connected to the cooling medium circuit. Through the inlet opening 309 the cooling medium flows into the receptacle 303. As a cooling medium, for example, ultra-pure water is suitable. Moreover, as a cooling medium also mixtures of ultra-pure water and ethylene glycol (for example, Glysantin of the company BASF), so-called cooling medium mixtures are suitable. With the illustrated arrows, the flow direction is indicated wherein thus the cooling medium flows from bottom to top through the ion exchanger 302. The cooling medium or cooling fluid is thus supplied by means of a cooling medium conduit and the inlet opening 309 into the container 301 from the bottom wherein then in the receptacle space 303 a distribution of the cooling medium across the entire surface of the bulk material by means of a fluid-permeable fiberglass pad is achieved. In particular, the bottom of the ion exchanger 302 is arranged in the receptacle space 303 so as to be spaced relative to the inner side of the bottom 307.

The cooling medium flows then through the ion exchange material 304 from the bottom to the top. Upon exiting from the ion exchange material 304 it is then introduced in the upper area of the ion exchanger 302 according to the arrows oriented to the left and to the right through a plurality of openings 308 that are formed in the wall of the ion exchanger 302 as well as in the walls 305 so as to pass from the ion exchanger 302 into the collecting chamber 306. The openings 308 are thus formed in the upper area of the container 301 and also in the upper area of the collecting chamber 306 or the wall that delimits the collecting chamber 306. The shaft-like receptacle 303 is thus centrally formed at the middle in the container 301. At the upper end, the ion exchanger 302 and the receptacle chamber 303 can be covered by a cover (not illustrated).

Laterally at the top, an outlet opening 310 is extending away from the collecting chamber 306 and is coupled to the cooling circuit and is embodied for discharging the cooling medium from the collecting chamber 306 into the cooling circuit.

Figure 14:
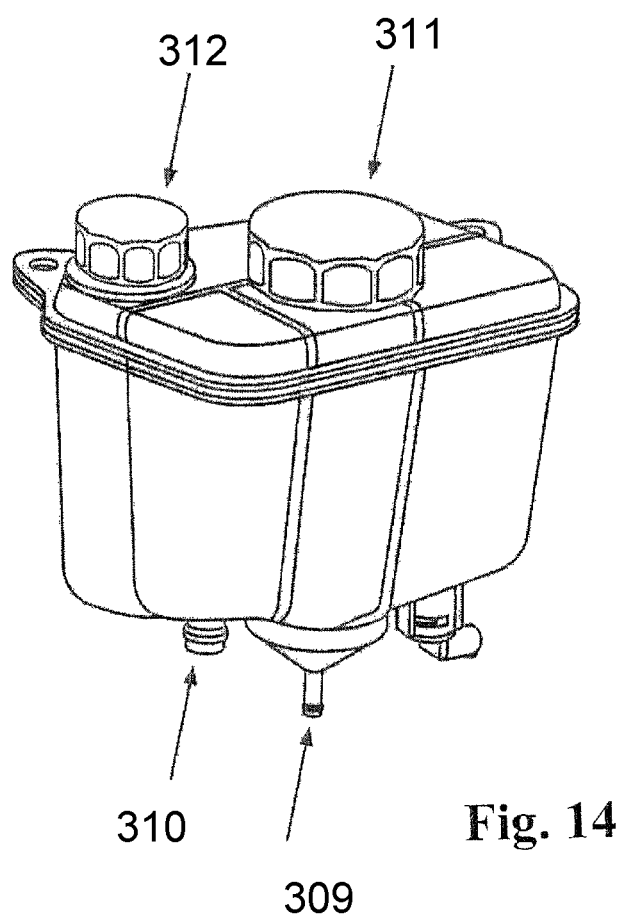
FIG. 14 depicts a further embodiment of a cooling medium compensation container.

FIG. 14 shows a variant of the cooling medium compensation container 301 according to the invention. In contrast to FIG. 13, the outlet opening 310 is arranged at the bottom of the cooling medium compensation container 301. In this way, improved mixing of the cooling medium flowing into the collecting chamber 306 and a safer venting of the cooling circuit can be ensured. The illustrated cooling medium compensation container 301 has moreover two covers: A first cover 311 for removal and installation or exchange of the ion exchanger 302; and a second cover 312 for possible refilling or exchanging of the cooling medium or cooling fluid.

Figure 15:
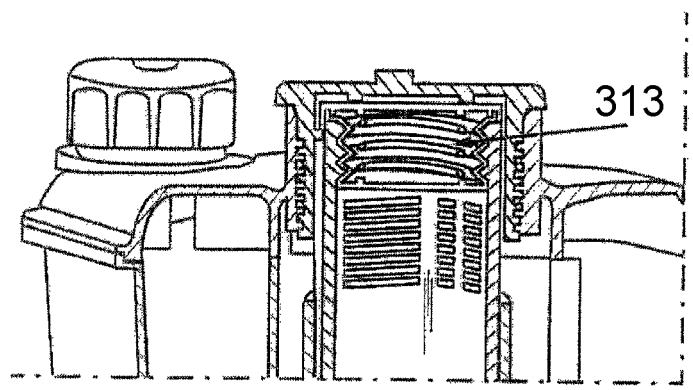
FIG. 15 depicts the additional fixation of the ion exchanger by means of a spring according to a further embodiment of a cooling medium compensation container.

The cover 312, as shown in FIG. 15, can have a spring 313 that acts onto the upper wall of the ion exchanger 302. In this way, the ion exchanger 302 can be secured, in addition to being secured by the mechanical means for locking, in order to secure it even better with respect to sliding as a result of shaking or the like.

In all of the above described embodiments of the cooling circuit 10, of the compensation containers 20, 301, of the ion exchanger cartridges 24, 302, and of the radiator 218 the following modifications are possible inter alia.

The invention is not limited to circuits 10 of fuel cells systems 12 of motor vehicles. It can be used also in stationary fuel cells systems or in cooling devices of other types of functional systems, for example, internal combustion engines or air-conditioning devices.

Instead of the ion exchanger cartridges 24, 302 also different ion exchangers or different treatment units, for example, filters for cooling fluid can be integrated in the compensation containers 20, 301 or the radiator 218.

The ion exchanger cartridges 24, 302, instead of being exchangeable, can also be arranged fixedly within the compensation containers 20, 301. For example, also self-regenerating treatment units can be provided that must not be exchanged.

The receptacle openings 64 for the ion exchanger cartridges 24, 302, instead of being arranged at the top, can also be arranged laterally or at the bottom in the compensation containers 20, 301.

The ion exchanger cartridges 24, 302 or other types of treatment units can be integrated into other types of containers for the cooling fluid instead of into the compensation containers 20, 301.

Instead of the inner cylinders 44 with the jackets 74 of the ion exchanger cartridges 24, 302 provided only at the top with through openings 46, also other types of components can be provided that predetermine the flow of the cooling fluid through the ion exchanger cartridges 24, 302. It is also possible to provide either the inner cylinders 44 or the jackets 74 of the ion exchanger cartridges 24,301 that are only open the top. When using inner cylinders 44, also ion exchanger cartridges can be used that have fluid-permeable jackets across their entire height.

Instead of the baffle plates 24, also other types of baffle devices or splash guard devices, for example, splash ribs for the cooling fluid can be arranged in the compensation containers 20.

The cooling circuit 10 can also be configured in a different way. For example, the compensation containers 20, 301 can be arranged at different locations, also within the main conduit system 14, instead of in the bypass conduit 22. The compensation containers 20, 301 with the ion exchanger cartridge 24, 302 can also be arranged at the hot side of the cooling circuit 10.

Instead of being welded, the cover parts 32 can also be connected seal-tightly with the base parts 30 of the compensation containers 20,301 in a different way, for example, screwed.

The ion exchanger cartridges 24, 302 can also be used in other types of devices for treating various fluids instead of in cooling devices.

The flow of the cooling fluid through the compensation containers 20, 301 can also be realized in reverse direction. The functions of the inlet socket 52 and of the outlet socket 56 are then switched. The ion exchanger cartridge 24, 302 is then flowed through from top to bottom. The supply of cooling fluid into the compensation container can also be realized from above.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A cooling fluid compensation container of a cooling device of a fuel cell system,
   wherein said cooling fluid compensation container is connectable fluidically with a conduit system for a cooling fluid that is fluidically connected to cool said fuel cell system,
   wherein said conduit system is fluidically connected with a treatment unit,
   wherein said treatment unit includes an ion exchanger operable to treat said cooling fluid,
   said cooling fluid compensation container having an interior and having outer walls enclosing at least a) through f) within it's interior:
      a) an axially extending circumferentially closed receptacle chamber wall, defining a hollow interior therein and having an open axial end, the circumferentially closed receptacle chamber wall arranged within the interior of the fluid compensation container,
      b) an opposing axial end of the receptacle chamber wall secured directly onto the interior of said cooling fluid compensation container,
      c) wherein said hollow interior forms a receptacle chamber,
      d) wherein said ion exchanger includes an axially extending tubular jacket circumferentially surrounding and defining a chamber within said ion exchanger and having ion exchange granules therein, said ion exchanger enclosed within the interior of the cooling fluid compensation container,
      e) wherein the tubular jacket of the ion exchanger cartridge is received within the receptacle chamber,
      f) at least one fluid reservoir chamber arranged within said cooling fluid compensation container and radially exterior to the receptacle chamber wall,
   wherein an open end of the tubular jacket of the ion exchanger cartridge is closed by a pressure disk compressing the ion exchange granules within the tubular jacket, and
   wherein said treatment unit is arranged upright within said cooling fluid compensation container.

2. The cooling fluid compensation container according to claim 1, wherein
   the ion exchanger is arranged within said cooling fluid compensation container such that a longitudinal axis of said cooling fluid compensation container and a longitudinal axis of said ion exchanger are oriented parallel or coaxial.

3. The cooling fluid compensation container according to claim 1, wherein
   said ion exchanger is arranged within said cooling fluid compensation container such that cooling fluid flows from bottom to top or from top to bottom through said ion exchanger.

4. The cooling fluid compensation container according to claim 1, wherein
   said ion exchanger is detachably arranged and detachably locked within said cooling fluid compensation container.

5. The cooling fluid compensation container according to claim 1, wherein
   said receptacle chamber is embodied as a shaft-like receptacle space for said ion exchanger,
   wherein said cooling fluid compensation container includes a collecting chamber for the cooling fluid,
   wherein said receptacle chamber wall is arranged within said cooling fluid compensation container separating said receptacle space from said collecting chamber,
   wherein in an upper area of said receptacle chamber wall at least one opening for passage of the cooling fluid that is passing through the ion exchanger into the collecting chamber is formed, and
   wherein said collecting chamber annularly surrounds said receptacle space.

6. The cooling fluid compensation container according to claim 5, wherein
   a bottom of said shaft-like receptacle space is also a bottom of said cooling fluid compensation container, and
   wherein at least one inlet opening into said receptacle space is formed in said bottom for said cooling fluid.

7. The cooling fluid compensation container according to claim 5, wherein
   said cooling fluid compensation container at its upper end has on outlet opening discharging said cooling fluid from said collecting chamber.

8. The cooling fluid compensation container according to claim 1, wherein
   said cooling fluid compensation container comprises an openable/closeable cover for removal and installation of said ion exchanger,
   wherein said cover comprises a spring arranged between said cover and said ion exchanger and operable to press onto an upper wall of said ion exchanger.

9. The cooling fluid compensation container according to claim 1, wherein
   said cooling fluid compensation container includes a closable refill socket operable for refilling cooling fluid into said cooling fluid compensation container.

10. The cooling fluid compensation container according to claim 1, wherein
   said cooling fluid compensation container includes a fluid filling level sensor.

\* \* \* \* \*